(12) United States Patent
Bastide et al.

(10) Patent No.: US 10,237,411 B2
(45) Date of Patent: Mar. 19, 2019

(54) SIMULTANEOUS PARTICIPATION IN A PLURALITY OF WEB CONFERENCES

(75) Inventors: Paul Roger Bastide, Boxford, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 2679 days.

(21) Appl. No.: 12/796,861

(22) Filed: Jun. 9, 2010

(65) Prior Publication Data

US 2011/0307550 A1 Dec. 15, 2011

(51) Int. Cl.
| | |
|---|---|
| *G06F 15/16* | (2006.01) |
| *G06F 3/048* | (2013.01) |
| *H04M 3/56* | (2006.01) |
| *H04L 12/18* | (2006.01) |
| *H04L 29/06* | (2006.01) |
| *H04L 29/08* | (2006.01) |

(52) U.S. Cl.
CPC ........ *H04M 3/563* (2013.01); *H04L 12/1827* (2013.01); *H04L 29/06* (2013.01); *H04L 65/4038* (2013.01); *H04L 65/4046* (2013.01); *H04L 67/02* (2013.01); *H04M 3/56* (2013.01); *H04L 12/1822* (2013.01)

(58) Field of Classification Search
CPC ....... H04L 65/403; H04L 67/02; H04L 43/10; H04L 41/0823
USPC ........................................ 709/203, 204, 227
See application file for complete search history.

(56) References Cited

U.S. PATENT DOCUMENTS

| | | | | |
|---|---|---|---|---|
| 6,466,785 | B1 * | 10/2002 | Chambert et al. | 455/422.1 |
| 6,813,714 | B1 * | 11/2004 | Hardjono et al. | 726/14 |
| 6,978,001 | B1 * | 12/2005 | Shaffer et al. | 379/202.01 |
| 7,426,532 | B2 * | 9/2008 | Bell et al. | 709/201 |
| 7,986,710 | B2 * | 7/2011 | Tominaga | H04L 67/325 370/449 |
| 8,036,766 | B2 * | 10/2011 | Lindahl et al. | 700/94 |
| 8,406,119 | B2 * | 3/2013 | Taylor et al. | 370/216 |
| 8,767,593 | B1 * | 7/2014 | Allen | 370/260 |
| 2004/0044724 | A1 * | 3/2004 | Bell et al. | 709/203 |
| 2004/0044725 | A1 * | 3/2004 | Bell et al. | 709/203 |
| 2004/0119814 | A1 * | 6/2004 | Clisham | H04N 7/141 348/14.08 |
| 2004/0148444 | A1 * | 7/2004 | Thomas et al. | 710/44 |
| 2005/0078612 | A1 * | 4/2005 | Lang | H04L 12/1818 370/260 |

(Continued)

*Primary Examiner* — Glenford J Madamba
(74) *Attorney, Agent, or Firm* — Moore & Van Allen PLLC; Charles L. Moore

(57) ABSTRACT

A method for simultaneously participating in a plurality web conferences may include generating, by a computer system, a web conference instance for each web conference being joined. The method may also include polling a corresponding web conferencing server for web conference information by each web conference instance on the computer system. The method may additionally include polling for both audio and video information in response to a chosen web conference instance being an active web conference instance on the computer system. The polling may be performed at a predetermined time interval or polling term. The method may further include setting a polling term for each inactive web conference instance on the computer system that is longer than the predetermined time interval or polling term of the active web conference instance.

17 Claims, 3 Drawing Sheets

(56) References Cited

U.S. PATENT DOCUMENTS

| | | | |
|---|---|---|---|
| 2005/0132009 A1* | 6/2005 | Solie | 709/206 |
| 2005/0261933 A1* | 11/2005 | Magnuson | 705/1 |
| 2006/0031290 A1* | 2/2006 | Mannaru | G06Q 10/10 709/204 |
| 2006/0245566 A1* | 11/2006 | Parker | 379/202.01 |
| 2006/0271624 A1* | 11/2006 | Lyle | G06Q 10/06 709/204 |
| 2007/0078976 A1* | 4/2007 | Taylor et al. | 709/224 |
| 2007/0121530 A1* | 5/2007 | Vadlakonda et al. | 370/260 |
| 2007/0186002 A1* | 8/2007 | Campbell | H04N 7/142 709/231 |
| 2008/0155104 A1* | 6/2008 | Quinn et al. | 709/227 |
| 2008/0232277 A1* | 9/2008 | Foo | H04L 12/1822 370/260 |
| 2008/0263636 A1* | 10/2008 | Gusler et al. | 726/4 |
| 2008/0301231 A1* | 12/2008 | Mehta et al. | 709/204 |
| 2008/0320145 A1* | 12/2008 | Rivera | 709/227 |
| 2009/0222519 A1* | 9/2009 | Boyd | 709/204 |
| 2010/0175004 A1* | 7/2010 | Deep | 715/758 |
| 2010/0311393 A1* | 12/2010 | Castleman | 455/412.1 |
| 2010/0312813 A1* | 12/2010 | Castleman | 709/201 |
| 2010/0313249 A1* | 12/2010 | Castleman | 726/5 |
| 2011/0044184 A1* | 2/2011 | Balasaygun | G06F 9/543 370/252 |
| 2011/0078318 A1* | 3/2011 | Desai et al. | 709/228 |
| 2011/0153728 A1* | 6/2011 | Einarsson et al. | 709/203 |

* cited by examiner

SIMULTANEOUS PARTICIPATION IN A PLURALITY OF WEB CONFERENCES

BACKGROUND

Aspects of the present invention relate to conferencing over a network or web conferencing, and more particularly to a method, system and computer program product for simultaneous participation in a plurality of web conferences from different hosts.

Web conferencing has become a widely used tool or application for holding meetings, particularly when meeting participants or attendees are located in different geographic locations. Participants can attend or participate in the meeting from their own office or other convenient location and do not have the expense and time involved in having to travel to a remote location. Under some circumstances it may be necessary for a user or participant to participate in or attend more than one web conference at the same time. There is currently no convenient arrangement to permit simultaneous participation in more than one web conference. Additionally, there is no current convenient means to permit monitoring of a plurality of concurrent web conferences and to permit a participant to easily switch between concurrent web conferences as needed or desired.

BRIEF SUMMARY

According to one aspect of the present invention, a method for simultaneously participating in a plurality web conferences may include generating, by a computer system, a web conference instance for each web conference being joined. The method may also include polling a corresponding web conferencing server for web conference information by each web conference instance on the computer system. The method may additionally include polling for both audio and video information in response to a chosen web conference instance being an active web conference instance on the computer system. The polling by the active web conference instance may be performed at a predetermined time interval. The method may further include setting a polling term for each inactive web conference instance on the computer system that is longer than the predetermined time interval.

According to another aspect of the present invention, a system for simultaneously participating in a plurality of web conferences may include a processor. The system may also include a module, operating on the processor, for simultaneously participating in the plurality of web conferences. The module for simultaneously participating in the plurality of web conferences may include a module to generate a web conference instance for each web conference joined. The module for simultaneously participating in the plurality of web conferences may also include a module for polling a corresponding web conferencing server for web conference information by each web conference instance. The module for simultaneously participating in the plurality of web conferences may additionally include a module for polling for both audio and video information in response to a chosen web conference instance being an active web conference instance. The polling may be performed at a predetermined time interval. The module for simultaneously participating in the plurality of web conferences may further include a module for setting a polling term for each inactive web conference instance on the computer system that is longer than the predetermined time interval.

According to a further aspect of the present invention, a computer program product for simultaneously participating in a plurality of web conferences may include a computer readable storage medium having computer readable program code embodied therewith. The computer readable program code may include computer readable program code configured to generate a web conference instance for each web conference being joined. The computer readable program code may also include computer readable program code configured to poll a corresponding web conferencing server for web conference information by each web conference instance. The computer readable program code may additionally include computer readable program code configured to poll for both audio and video information in response to a chosen web conference instance being an active web conference instance. The polling may be performed at a predetermined time interval. The computer readable program code may further include computer readable program code configured to set a polling term for each inactive web conference instance on the computer system that is longer than the predetermined time interval.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
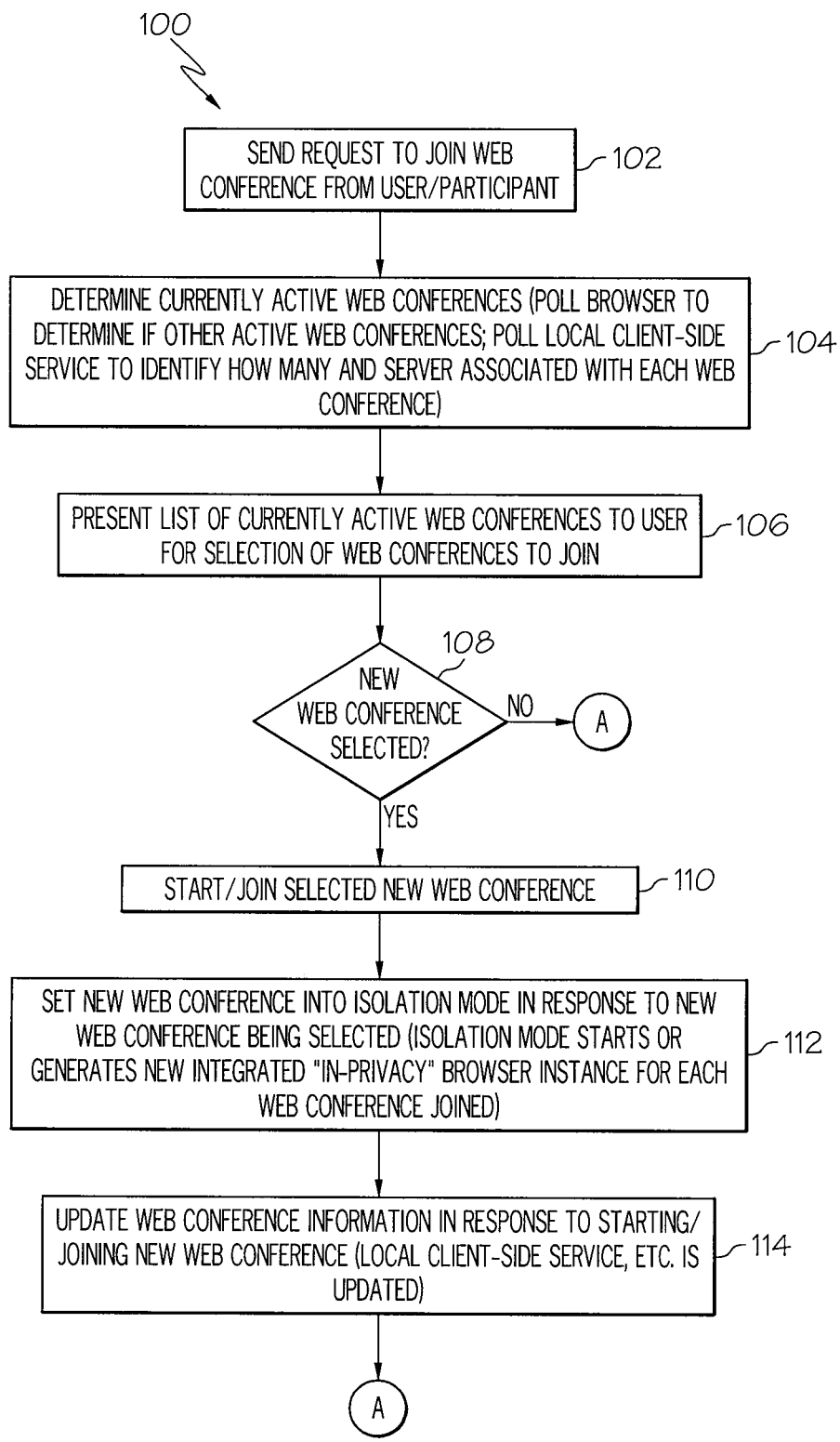
FIGS. 1A and 1B are a flowchart of an example of a method for simultaneously participating in a plurality of web conferences in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
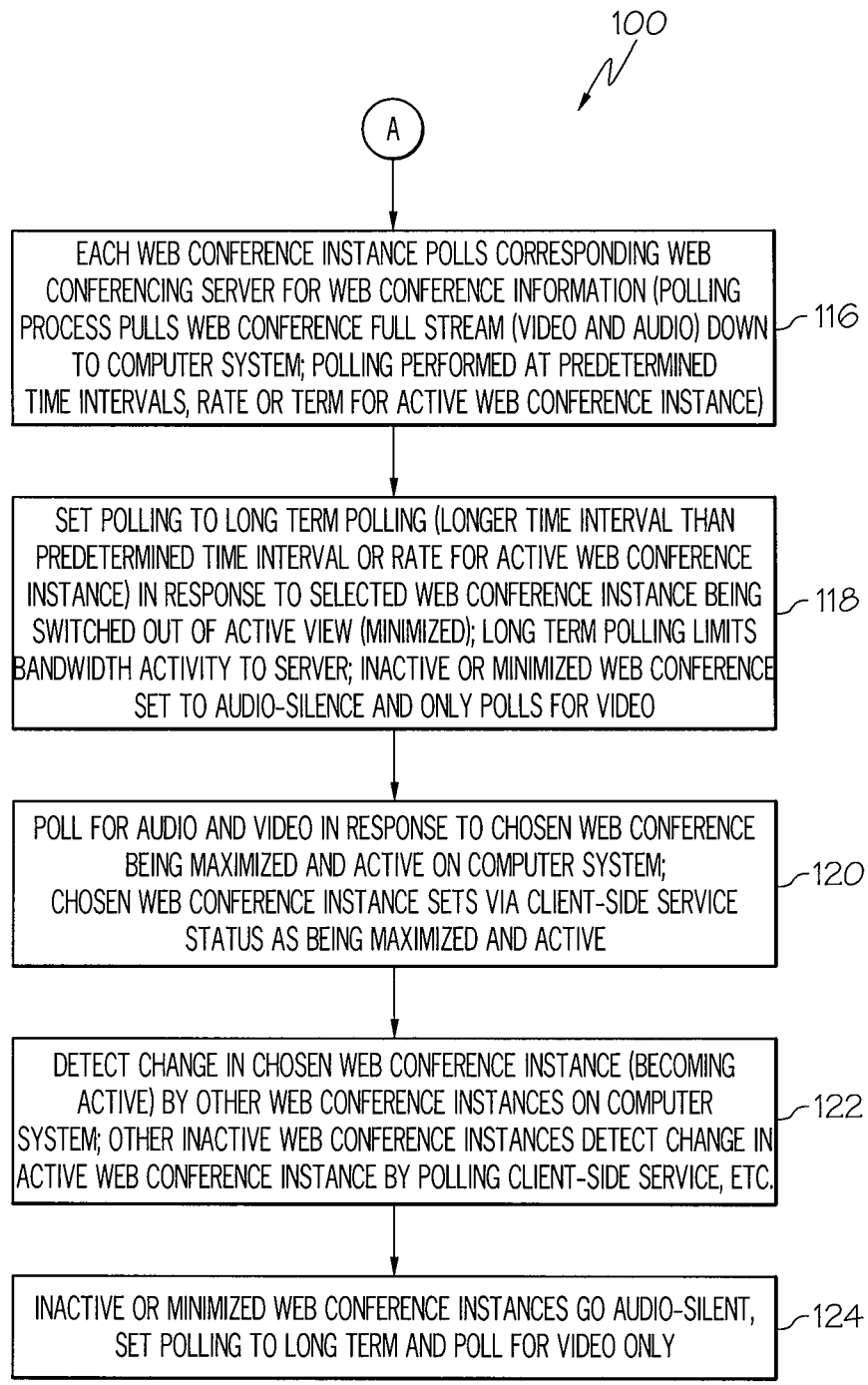

FIGS. 1A and 1B are a flowchart of an example of a method 100 for simultaneously participating in a plurality of web conferences in accordance with an embodiment of the present invention. In block 102, a request may be sent by a user via a computer system to join a web conference. The user may access a server or web server or other online service via a browser operating on the computer system or other communications device to request to join a particular web conference or web conferences. As used herein the client computer system or computer system may be any communications device including mobile communications devices capable of performing the operations or functions described herein and capable of permitting a user to participate in a web conference or multiple concurrent web conferences.

In block 104, a determination may be made as to what web conferences are currently active. The currently active web conferences may be determined by polling a browser operating on the computer system to determine if there are other active web conferences. A client-side service may be polled to identify how many web conferences are currently active and to identify a web server or host associated with each active web conference. A client-side service may be a local Hypertext Transfer Protocol (HTTP) Server, component object model (COM), ActiveX service or similar service.

In block 106, a list of currently active web conferences may be presented to the user on a display of a computer system or other device. The user may select one or more web conferences which the user may desire to join. In block 108, a determination may be made whether the user selected any new web conferences to be joined. If no new web conferences have been selected to be joined by the user, the method 100 may advance to block 116 in FIG. 1B. If the user has selected to join a new web conference, the method 100 may advance to block 110. The user may join and participate in a plurality of web conferences at the same time as described herein.

In block 110, the joining process may be started for each new web conference selected. In block 112, the new web conference may be set into an isolation mode by the computer system or browser operating on the computer system. The isolation mode or similar mode or browser function may start or generate a privacy protected browser session for each web conference joined. An example of a privacy protected browser may be Google Chrome InCognito or Microsoft Internet Explorer In-Privacy. Google and Google Chrome InCognito are trademarks of Google, Inc. in the United States, other countries or both. Microsoft and Internet Explorer are trademarks of Microsoft in the United States, other countries or both.

In block 114, information related to the web conference may be updated in response to starting or joining the new web conference. The web conference information may include, but is not necessarily limited to data, content or similar information related to the particular web conference. The client-side service or similar service may be updated with the web conference related information.

In block 116, each web conference instance may poll a corresponding web conferencing server hosting the web conference for web conference information. The polling process may pull the web conference full stream down to the computer system. The full stream web conference may include video and audio of the web conference and may include any other content or data related to the web conference. The polling may be performed at predetermined time intervals or at a predetermined rate or term for an active web conference instance on the computer system. The active web conference instance on the computer system may be the web conference that is currently live or in active view on the computer display and the audio and video associated with the web conference is currently being presented by the display and speaker system of the client computer.

In block 118, polling may be set to long term polling in response to a selected web conference instance being switched out of the active view to an inactive status on the client computer. The long term polling may be a longer term or longer time interval or duration between polling operations than the predetermined time interval rate or term for an active web conference instance. Polling for active web conference information may be about 30 seconds. Long term polling may be about 2 minutes or less. Long term polling limits bandwidth activity to the associated web conferencing server. Inactive web conference instances may be minimized on the client computer to provide more screen area on the display for presenting the active web conference information. The inactive and/or minimized web conference instances may be set to audio-silence or muted on the client computer. The inactive and/or minimized web conference instances may also only poll for video information or data from the respective associated web conferencing servers or hosts in addition to the long term polling limit to further minimize the use of bandwidth by the inactive web conference instances.

In block 120, a web conference instance may poll for both audio and video information or data in response to the web conference instance being chosen to become active on the computer system. If minimized in the inactive state, in response to being chosen to be the active web conference, the web conference instance chosen to become active may also be maximized. The web conference instance may be chosen to become active by the user using a computer pointing device or the like to select or chose the inactive web conference instance. The client-side service may be used to set the status of the chosen web conference instance to the active state.

In block 122, a change in status of the chosen web conference instance from inactive to active view may be detected or determined by the other web conference instances on the computer system. The other inactive web conference instances may detect the change in status of the chosen web conference instance to become the current active web conference instance by polling the client-side service or by other means or service.

In block 124, the web conference instance goes audio-silent or mute in response to becoming inactive and/or minimized. The web conference instance may be inactivated by another web conference instance being chosen to become active or the currently active web conference being selected to become inactive or minimized. As previously discussed, the polling for inactive web conference instances may be set to long term polling or polling between longer time intervals compared to the polling term or interval of the active web conference instance. Additionally, the inactive web conference instance may only poll for video data or information related to the corresponding web conference.

Figure 2:
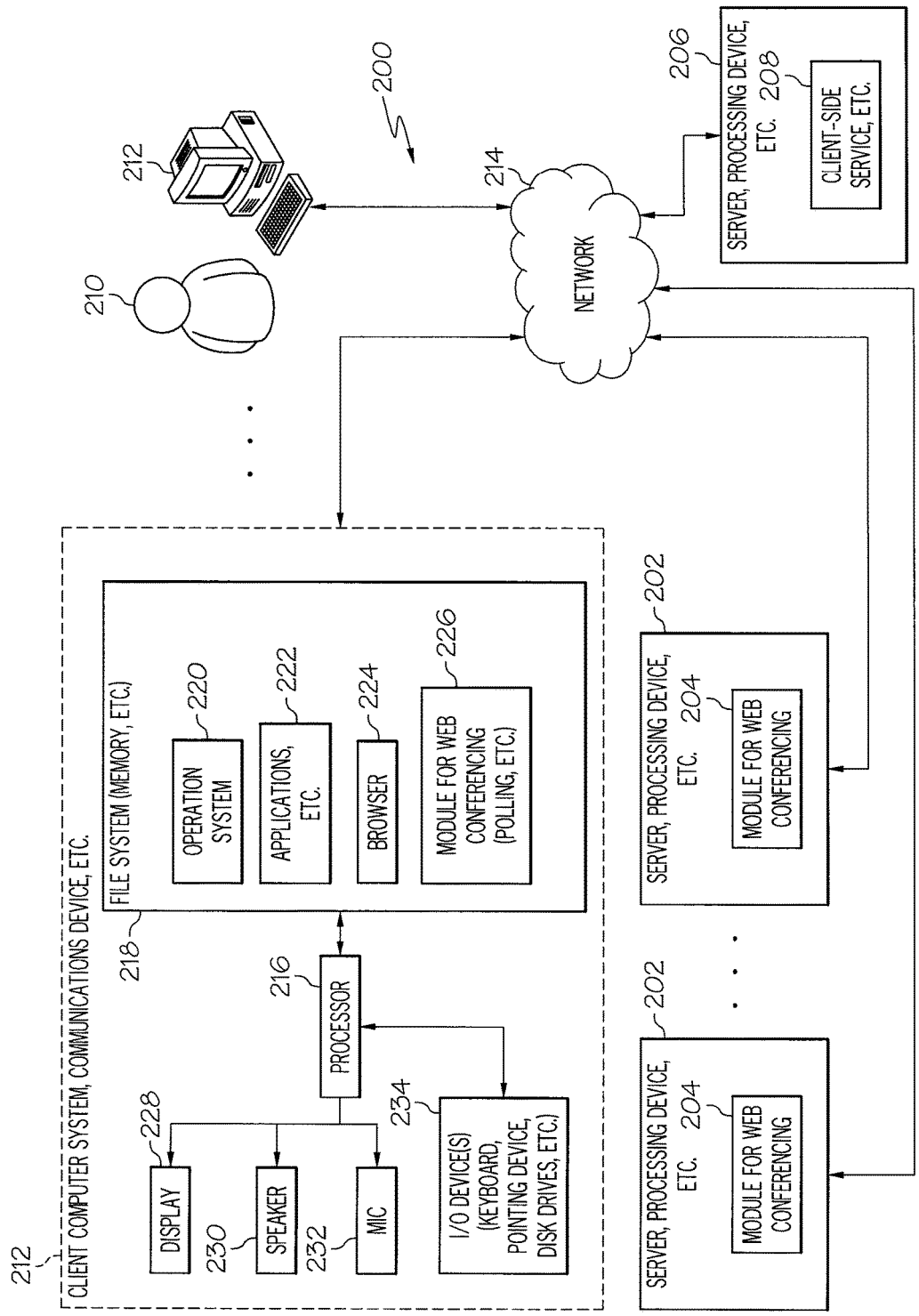
FIG. 2 is a block schematic diagram of an example of a system for simultaneously participating in a plurality of web conferences in accordance with an embodiment of the present invention.

FIG. 2 is a block schematic diagram of an example of a system 200 for simultaneously participating in a plurality of web conferences in accordance with an embodiment of the present invention. The method 100 of FIGS. 1A and 1B may be embodied in or performed by the system 200. The system 200 may include a plurality of servers 202 or processing device. Each of the servers 202 may be a web conferencing server or similar processing device for hosting a web conferencing service. A module 204 for web conferencing may be operable on each server or web server 202 for providing the web conferencing services described herein. The module 204 may be stored on a file system of the web server 202. Portions of or all of the method 100 may be embodied in or performed by the module 204.

The system 200 may also include another server 206 or processing device. The server 206 or processing device may host a client-side service 208 or other service capable of providing the services similar to those described herein for a client-side service.

A user or web conference participant 210 may use a computer system 212 to access the web conferencing server 204 and module 204 and the client-side server 206 and client-side service 208 via a network 214. The computer system 212 may be any type of communications device including mobile communications devices or the like capable of performing the functions or operations described herein and capable of permitting a user to participate in a web conference or multiple concurrent web conferences similar to that described herein. The network 214 may be the Internet, an intranet or other private or proprietary network.

The computer system 212 may include a processor 216 to control operation of the computer system 212 and a file system 218, memory or similar data storage device. An operating system 220, applications 222 and other programs may be stored on the file system 218 for running or operating on the processor 216. A web or Internet browser 224 may also be stored on the file system 218 for accessing one or more of the web conferencing servers 202 via the network 214 for participating in one or more web conference simultaneously.

A module for web conferencing 226 may also be stored on the file system 218 for operation on the processor 216. The module for web conferencing 226 may perform all of the functions of the exemplary method 100 described with reference to FIGS. 1A and 1B or may perform some of the functions of method 100 along with the respective modules 204 operating on each of the web conferencing servers 202 and the client-side service server 206. All or portions of the method 100 may be embodied in the web conferencing module 226 on the computer system 212.

The computer system 212 may also include a display 228 for presenting the content being shared or streamed by the web conferencing servers 202. The computer system 212 may also include a speaker system 230 for receiving and presenting audio content from the web conferencing servers 202 to the user 210. The computer system 212 may additionally include a microphone 232 for the user 210 to communicate with a moderator of each web conference and with other participants of each web conference and to make any presentation if the user 210 is a presenter in any of the plurality of web conferences.

The computer system 212 may further include one or more input devices, output devices or combination input/output devices, collectively I/O devices 234. The I/O devices 234 may include a keyboard, pointing device, such as a mouse or other computer pointing device, disk drives and any other devices to permit a user, such as user 210, to interface with and control operation of the computer system 212 and to access the web conferencing servers 202.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for simultaneously participating in a plurality of web conferences, the method comprising:

generating, by a computer system of a user, a web conference instance on the computer system for each of the plurality of web conferences joined by the user;

polling a corresponding web conferencing server for web conference information by each web conference instance on the computer system;

polling for both audio and video information in response to a chosen web conference instance being an active web conference instance on the computer system, wherein the polling of the active web conference instance is performed at a predetermined time interval while active;

setting a polling term or time interval between polling operations for each inactive web conference instance on the computer system that is longer than the predetermined time interval for the active web conference instance and minimizes use of bandwidth by each inactive web conference instance;

polling only for video information by each inactive web conference instance; and muting each inactive web conference instance on the computer system.

2. The method of claim 1, further comprising polling only for video information by each inactive web conference instance.

3. The method of claim 1, detecting a change in the chosen web conference instance by other web conference instances on the computer system in response to the chosen web conference instance switching from an inactive state to becoming the active web conference instance on the computer system.

4. The method of claim 3, further comprising polling a client-side service by each of the inactive web conference instances to detect the change in the chosen web conference instance becoming the active web conference instance on the computer system.

5. The method of claim 4, wherein the inactive web conference instances go audio-silent or are muted on the computer system of the user in response to detecting the chosen web conference instance becoming active.

6. The method of claim 5, further comprising minimizing each web conference instance in response to the web conference instance becoming inactive.

7. The method of claim 5, further comprising setting a polling term of each web conference instance to a long term polling time interval in response to the web conference instance becoming inactive, wherein the long term polling time interval is longer than the predetermined time interval.

8. The method of claim 1, further comprising determining a list of currently active web conferences.

9. The method of claim 8, wherein determining a list of currently active web conferences comprises polling a browser to determine the currently active web conferences.

10. The method of claim 8, wherein determining the list of currently active web conferences comprises polling a client-side service to identify each active web conference and a web conferencing server associated with each active web conference.

11. The method of claim 8, presenting the list of currently active web conferences to a user for selecting the web conferences to join.

12. The method of claim 11, further comprising setting each web conference into an isolation mode in response to being selected by the user for joining, wherein the isolation mode starts a new integrated privacy-protected browser instance for each web conference joined.

13. A system for simultaneously participating in a plurality of web conferences, the system comprising:
a processor;
a module, operating on the processor, for simultaneously participating in the plurality of web conferences, the module comprising:
a module to generate, on a computer system of a user, a web conference instance for each of the plurality of web conferences joined by the user;
a module for polling a corresponding web conferencing server for web conference information by each web conference instance;
a module for polling for both audio and video information in response to a chosen web conference instance being an active web conference instance, wherein the polling of the active web conference instance is performed at a predetermined time interval while active; and
a module for setting a polling term or time interval between polling operations for each inactive web conference instance that is longer than the predetermined time interval for the active web conference instance and minimizes use of bandwidth by each inactive web conference instance, wherein each inactive web conference instance polls the corresponding web conferencing server only for video information and each inactive web conference instance is muted on the computer system.

14. The system of claim 13, wherein an audio of each inactive web conferencing instance is muted in response to the web conferencing instance becoming inactive.

15. The system of claim 13, wherein the active web conference instance is maximized on the processor and the inactive web conference instances are minimized.

16. A computer program product for simultaneously participating in a plurality of web conferences, the computer program product comprising:
a non-transitory computer readable storage medium having computer readable program code embodied therewith, the computer readable program code comprising:
computer readable program code configured to generate, on a computer system of a user, a web conference instance for each of the plurality of web conferences joined by the user;
computer readable program code configured to poll a corresponding web conferencing server for web conference information by each web conference instance;
computer readable program code configured to poll for both audio and video information in response to a chosen web conference instance being an active web conference instance, wherein the polling of the active web conference instance is performed at a predetermined time interval while active;
computer readable program code configured to set a polling term or time interval between polling operations for each inactive web conference instance that is longer than the predetermined time interval for the active web conference instance and minimizes use of bandwidth by each inactive web conference instance;
computer readable program code configured to poll only for video information by each inactive web conference instance; and
computer readable program code configured to mute each inactive web conference instance.

17. The computer program product of claim 16, wherein the computer readable program code further comprises computer readable program code configured to set a polling term of each web conference instance to a long term polling time interval in response to the web conference instance becoming inactive, wherein the long term polling time interval is longer than the predetermined time interval.

* * * * *